US005790640A

United States Patent [19]
Tassa et al.

[11] Patent Number: 5,790,640
[45] Date of Patent: Aug. 4, 1998

[54] APPARATUS AND METHOD FOR STORING AND TRANSMITTING DATA BETWEEN A COMPUTER, A FACSIMILE MACHINE AND A TELEPHONE NETWORK

[76] Inventors: Menachem Tassa, 26 Habanai Street, Jerusalem, Israel, 96264; Gad Na'aman, Fontech Ltd. 131 Hapalmach Street, Beer Sheva, Israel, 84152

[21] Appl. No.: 690,498

[22] Filed: Jul. 31, 1996

[51] Int. Cl.$^6$ .................. H04M 11/00; H04N 1/00; H04N 1/32

[52] U.S. Cl. .................. 379/100.15; 379/100.09; 358/407; 358/442

[58] Field of Search .................. 379/100.01, 100.06, 379/100.08, 100.09, 100.12, 100.15, 93.05, 93.07, 93.09, 93.11, 122; 358/400, 404, 407, 434, 438, 442, 443, 468

[56] References Cited

U.S. PATENT DOCUMENTS

| 4,165,520 | 8/1979 | Wessler et al. | 358/280 |
| 4,716,543 | 12/1987 | Ogawa et al. | 364/900 |
| 4,964,154 | 10/1990 | Shimotono | 379/100 |
| 4,994,926 | 2/1991 | Gordon et al. | 358/400 |

*Primary Examiner*—Curtis A. Kuntz
*Assistant Examiner*—George Eng
*Attorney, Agent, or Firm*—Fenwick & West LLP

[57] ABSTRACT

A system for storing and transmitting data comprises a processor, a memory, an output device, a facsimile-modem unit, and a line interface unit. The line interface couples the processor and the facsimile-modem unit via lines to the facsimile machine and telephone network. The processor is also coupled to the computer and a memory, and controls the facsimile-modem unit and the line interface unit. The system stores and transfers data to operate in a capture mode, an auto-receive mode, a fax-modem mode, a printer mode, or a scanning mode. The present invention also includes a number of methods, including a method for determining the operational mode of the data transfer system; a method for capturing and storing facsimile transmissions; a method for transmitting and sending data over the telephone line; a method for sending data for printing; and a method for scanning data for storage.

17 Claims, 13 Drawing Sheets

APPARATUS AND METHOD FOR STORING AND TRANSMITTING DATA BETWEEN A COMPUTER, A FACSIMILE MACHINE AND A TELEPHONE NETWORK

BACKGROUND OF THE INVENTION

1. Field of the Invention

The present invention relates generally to electronic communications and interface devices for computer systems. In particular, the present invention relates to an apparatus and method for storing and transmitting data between a computer, a facsimile machine and a telephone network.

2. Description of the Background Art

The use and proliferation of personal computers is well known. Personal computers are widely used for home, business and educational purposes. Personal computers often include modems which allow the computer to be coupled to telephone lines and communicate with other computers. Such modems have also been adapted such that they are able to receive and send facsimile (fax) transmissions. Such devices are often referred to as fax-modems, and can be internal (built inside the computer) or external (a peripheral device, external but coupled to the computer). However, a particular problem with existing fax-modems whether they be internal or external is that they require the computer be operational in order for them to be operational. Existing internal fax-modems commonly rely on the computer to provide power. Internal and external fax-modems usually require use of the internal components of the computer such as memory, processor and hard disk space to function. This is particularly problematic because generally a facsimile system must always be operational for receipt of facsimile transmissions at any time while computers and modems are typically only made operational when they are in use. Therefore, in the prior art there is a waste of power associated with computers having fax-modems since the entire computer must be operational for facsimile use, as well as a general confusion regarding the necessity of keeping such computers powered up and operational.

Another problem with fax-modems is that they, unlike fax machines, do not include a scanner. Thus, such modems may only be used to send data and images already available to the computer. In order to provide the same functionality as a facsimile machine, both a scanner and a fax-modem are required. However, the combined cost of a scanner and a fax-modem are significantly greater than a simple facsimile machine. Therefore, the cost becomes a prohibitive factor unless there are alternative uses of the scanner.

The use and prevalence of facsimile machines extends beyond those of fax-modems. Facsimile machines, like computers are a standard type of office equipment that is part of most offices. However, one problem with most existing facsimile machines and computers is that typically there is no simple way to interconnect them to operate together. Each device stands alone, performs only its function, and cannot interact with the other. Moreover, facsimile machines, cannot send binary data to computers. They can send images only, defined by CCITT Group 3 protocol.

Therefore, there is a continuing need for a simple and reliable system and method for interconnecting a computer, a facsimile machine and a telephone network, allowing the bi-directional transfer of both Group 3 images and binary data. This system and method should not require extensive hardware and be able to store data being transferred between the computer, facsimile machine and telephone network.

SUMMARY OF THE INVENTION

The present invention overcomes the deficiencies and limitations of the prior art with a system and method for storing and transferring ordinary facsimile images and binary data between a computer, a facsimile machine and a telephone network. The preferred embodiment of the system advantageously eliminates the aforementioned problems, and couples a computer, a facsimile machine and a telephone network together for operation as a scanner, a printer, a fax-modem and a facsimile storage device. The preferred embodiment of the system of the present invention comprises a processor, memory, an input/output port, a facsimile-modem unit, a line interface unit, and a status indicator. The line interface couples the processor and the facsimile-modem unit via lines to the facsimile machine and telephone network. The processor is also coupled to the computer and a memory; and controls the facsimile-modem unit and the line interface unit.

The system is able to store and transfer data and operates in one of five modes: a capture mode, a fax-modem mode, a printer mode, a scanning mode and an auto-receiving mode. In the capture mode, the system operates in parallel to the facsimile machine, as a passive monitor, to capture facsimile transmissions received by the facsimile machine. In this mode, the system can determine whether the computer is operational and configured to receive the captured transmissions in real time or store them until the computer is made ready to download the stored transmissions. Further, in this mode, the system can be configured to capture all incoming transmissions or only transmissions of a special type, e.g., carrying binary data. In the fax-modem mode, the system interfaces with the computer and the telephone line to enable operation of the computer in modem communication or as a facsimile engine for the transmission and reception of facsimile transmissions. In the printer mode, the system couples the computer and the facsimile machine so that the computer can print data on the facsimile machine. In the scanner mode, the system couples the computer and the facsimile machine so that the computer can receive images scanned by the facsimile machine. Finally, in the auto receive mode, the system can operate independently of a facsimile machine to receive and store incoming transmissions. In this mode also, the system can be configured to receive transmissions of a special type only, and it also can determine whether the computer is operational, and then stores the facsimile transmission or transfers the facsimile transmission to the computer according to the determinations made.

The present invention also includes a number of methods for storing and transmitting data. The present invention includes a method for determining the operational mode of the data transfer system; a method for capturing and storing facsimile transmissions; a method for transmitting and receiving data over the telephone line, a method for sending data for printing, and a method for scanning data for storage.

DETAILED DESCRIPTION OF THE PREFERRED EMBODIMENTS

Figure 1A:
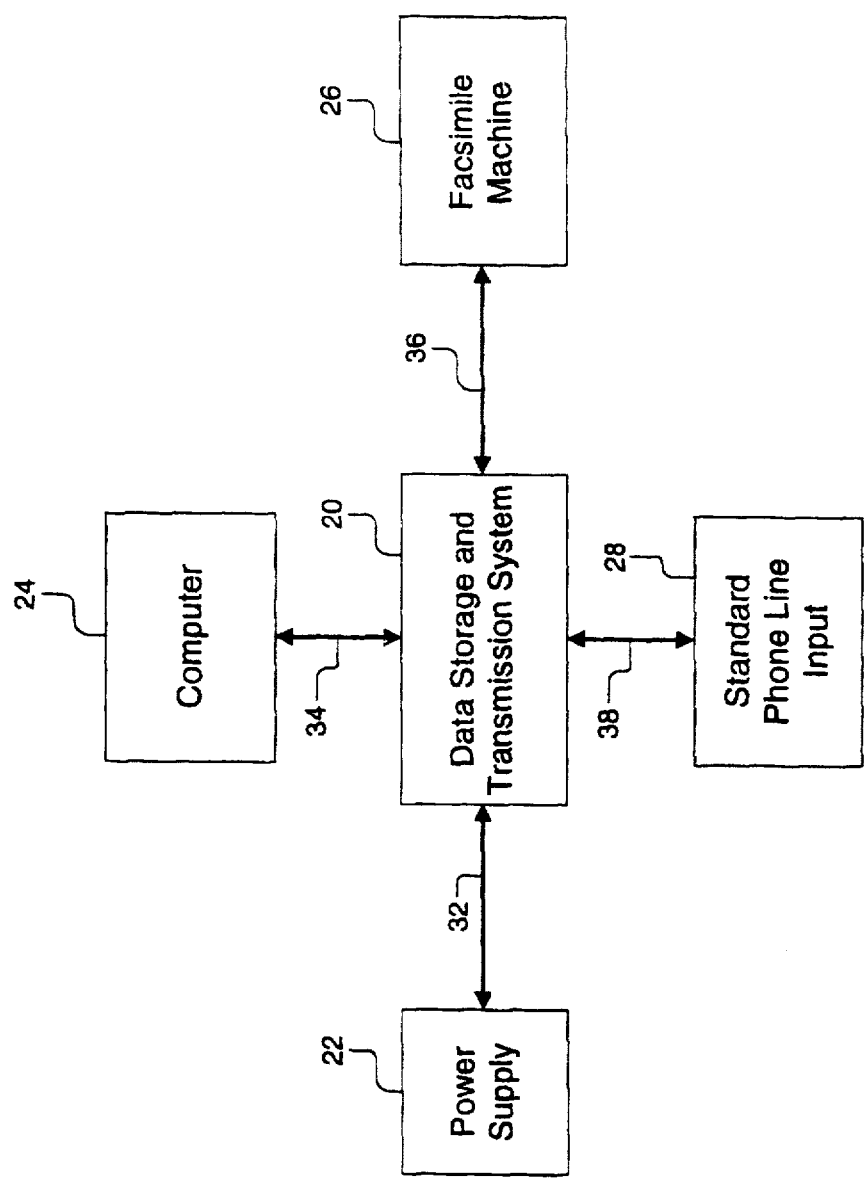
FIG. 1A is a block diagram of a system of the present invention for storing and transmitting data in a preferred environment coupled to a computer, a facsimile machine, a standard telephone line and a power supply.

Referring now to FIG. 1A, a block diagram of a preferred embodiment of a system 20 of the present invention for storing and transmitting data is shown. In a preferred environment, the system 20 is coupled to a computer 24, a facsimile machine 26, a telephone network 28 and a power supply 22 as shown. The system 20 advantageously couples different types of devices 24, 26, 28 together such that portions of functionality provided by each of the different devices 24, 26, 28 can be utilized by the computer 24. The system 20 is preferably coupled via line 32 to its own power supply 22 so that the system 20 can be operated independently of any other devices 24, 26 to which it may be connected. The power supply 22 is preferably a conventional 9 volt DC power supply. The system 20 is also coupled via line 34 to the computer 24, via line 36 to the facsimile machine 26 and via line 38 to a standard telephone line input 28 for further coupling to a public switched telephone network (PSTN) or private branch exchange (PBX). The computer 24, facsimile machine 26, and standard telephone line 28 are any one of a variety of conventional respective devices as is known in the art. For example, the computer 24 comprises a central processing unit (CPU) that connects with a display device, random access memory (RAM), read-only memory (ROM), an input device, and a data storage device. The central processing unit (CPU), display device, input device, and memory are coupled in a von Neuman architecture via a bus such as a personal computer. The central processing unit is preferably a microprocessor such as a Motorola 68040 or Intel Pentium; the display device is preferably a video monitor; and the input device is preferably a keyboard and mouse type controller. The CPU is also coupled to the data storage device in a conventional manner. In an exemplary embodiment, the computer is a IBM-type personal computer. Those skilled in the art will realize that the computer 24 could also be implement as a UNIX workstation or a Macintosh computer manufactured by Apple computer.

Figure 1B:
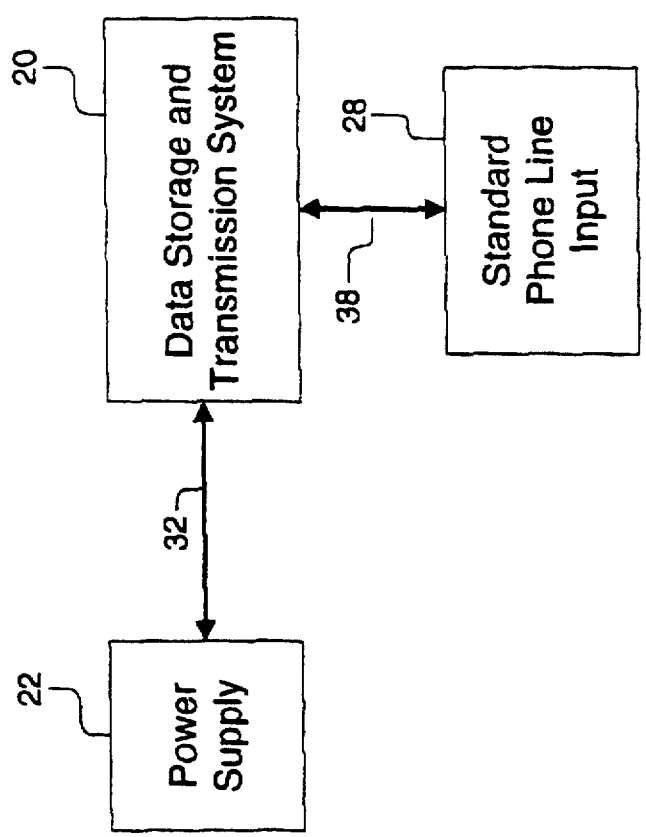
FIG. 1B is a block diagram of the system of the present invention for storing and transmitting data in a second environment coupled to a power supply and a standard telephone line.

Referring now to FIG. 1B, a block diagram of the system 20 of the present invention for storing and transmitting data in a second environment coupled to the power supply 22 and the telephone line 28 is shown. For convenience and ease of understanding like reference numerals have been used for like parts. FIG. 1B is provided to illustrate that in one operational mode, as will be in more detail described below, the system 20 need only be provided power and connected to the telephone network 28 to receive and store facsimile transmissions. FIG. 1B does not show a computer 24 and a facsimile machine 26 as being connected to the data storage and transmission system 20 to illustrate that even if these devices 24, 26 are connected, but not powered up, the data storage and transmission system 20 continues to be able to receive and store facsimile transmissions. The facsimile transmissions are received on line 38, and processed and stored by the data storage and transmission system 20 which is powered by the power supply 22. Since the data storage and transmission system 20 has an independent power supply 22, it can operate independent of operation of the other devices 24, 26., such as when they are not powered up or completely disconnected as shown in FIG. 1B.

Figure 2:
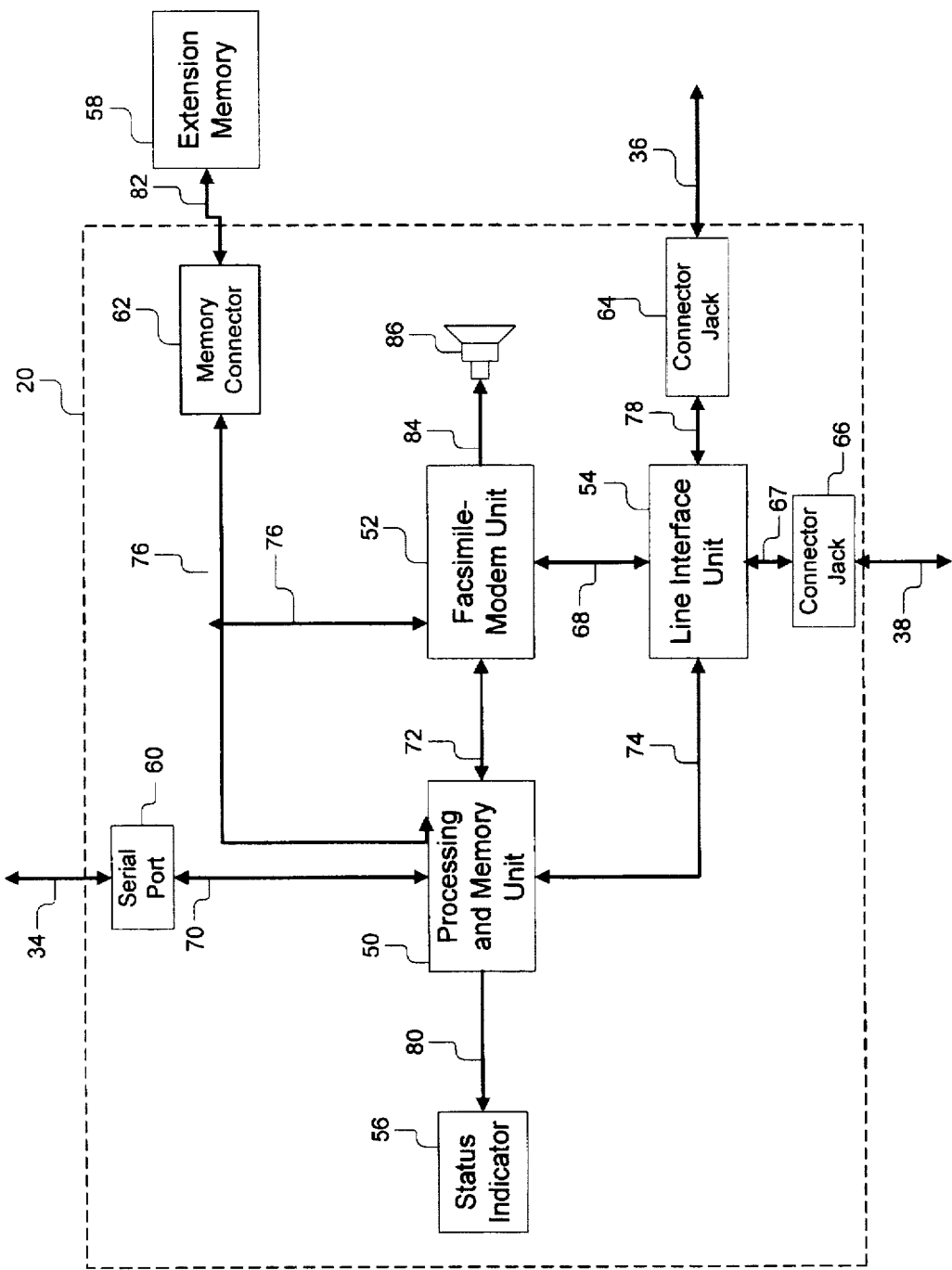
FIG. 2 is a block diagram of a preferred embodiment of the system for storing and transmitting data constructed according to the present invention.

Referring now to FIG. 2, a block diagram of a preferred embodiment of the data storage and transmission system 20 constructed according to the present invention is shown. The data storage and transmission system 20 preferably comprises a processing and memory unit 50, a facsimile-modem unit 52, a line interface unit 54, a status indicator 56 and a speaker 86. The processing and memory unit 50 are responsible for interfacing with the computer 24 and determining the operating mode of the system 20. The processing and memory unit 50 also control the transfer and storage of data in the system 20, and has a plurality of inputs and outputs coupled to control operation of the facsimile-modem unit 52, line interface unit 54, and status indicator 56.

The processing and memory unit 50 has an output coupled by line 80 to the input of the status indicator 56. The status indicator 56 is preferably a plurality of light-emitting diodes (LED), each of which signals a particular status of the system 20., For example, a first LED of the status indicator 56 indicates whether the system 20 is operational. A second LED of the status indicator 56 indicates whether the memory unit 50 is full or there is space available to store additional incoming faxes in the system 20. The processing and memory unit 50 control the operation of the LEDs of the status indicator 56 to provide additional status information such as flashing either or both of the LED to indicate a fax is being received, or assertion of both LEDs of the status indicator 56 to indicate a hardware defect. Those skilled in the art will realize that there are variety of combinations of asserting the LEDs and that additional LEDs may be coupled to provide additional feedback about system 20 state to the user.

The processing and memory unit 50 are also coupled via line 70 to a serial port 60. The serial port 60 couples line 70 to line 34. The serial port 60 is preferably a standard DB-9 connector. The serial port 60 allows the system 20 to be connected to and communicate with the computer 24. Those skilled in the art will realize that the serial port 60 could be any one of a variety of bus type connections, including a parallel port or a NUBUS connector.

Similarly, the processing and memory unit 50 are also coupled by bus 76 to a memory connector 62. The memory connector 62 is, for example, a standard J1 connector. Those skilled in the art will realize that the memory connector 62 could be any one of a variety of memory connectors known in the art. The memory connector 62 couples the internal bus 76 to external lines 82 for communicating data, commands and addresses. The external line 82 in turn is coupled to an extension memory 58. The extension memory 58 is preferably flash memory and may be up to 7 Megabytes in size. However, the extension memory 58 could be DRAM or SRAM coupled with a battery back up. The memory connector 62 is particularly advantageous because it allows the storage capacity of the system 20 to be increased according to the needs of the user. The additional storage capacity provided by the extension memory 58 can be used to store additional incoming faxes. Such an extension memory 58 7 megabytes in size allows the system 20 to store up to 280 pages of standard facsimile transmissions.

The facsimile-modem unit 52 is coupled to line 72. The facsimile-modem unit 52 also has a plurality of other inputs and outputs. One output of the facsimile-modem unit 52 is coupled via line 84 to the speaker 86. This allows the user to monitor call progress of the system 20. The facsimile-modem unit 52 is also coupled to the internal bus 76 and to the processing and memory unit 50. This coupling allow transfer of data between the facsimile-modem unit 52 and the processing and memory during modem operation and also for the reception and transmission of facsimile data. Finally, the facsimile-modem unit 52 is coupled by line 68 to the line interface unit 54 for coupling to the facsimile machine 26 or the telephone line 28. The facsimile-modem unit 52 is preferably a single chip such as a RC299ATF manufactured by Rockwell. The facsimile-modem unit 52 preferably has the ability to operate in group 3 fax modes including but not limited to V.17 (14400/12000/9600/7200 bps) transmit, V.29 (9600/7200 bps) transmit and receive, V.27 (4800/2400 bps) transmit and receive, and V.21 Channel 2 (300 bps) transmit and receive. The facsimile modem unit 52 preferably also supports data modes such as CCITT V.22 bis (2400 bps), V.22 (1200 bps), Bell 212A (1200 bps), 103 (300 bps) and V21. (300 bps); and enhanced AT commands and Fax class 1 commands (EIA/TIA-578). The facsimile-modem unit 52 like conventional external fax-modems is able to receive facsimile transmissions, send facsimile transmissions or support modem communication.

The line interface unit 54 is also coupled to the memory and processor unit 50 via line 74 and to the facsimile-modem unit 52 via line 68. The line interface unit 54 has additional inputs and outputs coupled to lines 67 and 78 for connection to respective connector jacks 66 and 64. The connector jacks 64, 66 are preferably RJ-11 connector jacks and allow coupling of the system 20 by standard twisted pair telephone cable to a telephone line/network 28 and the facsimile machine 26. The connector jacks 66 and 64 are respectively coupled to lines 38 and 36. The line interface unit 54 is preferably formed of discrete components and will be described in more detail below with reference to FIG. 5. The line interface unit 54 preferably provides ring detection, electrical isolation, pulse/tone dialing and line monitoring needed for the operating modes of the present invention.

Figure 3:
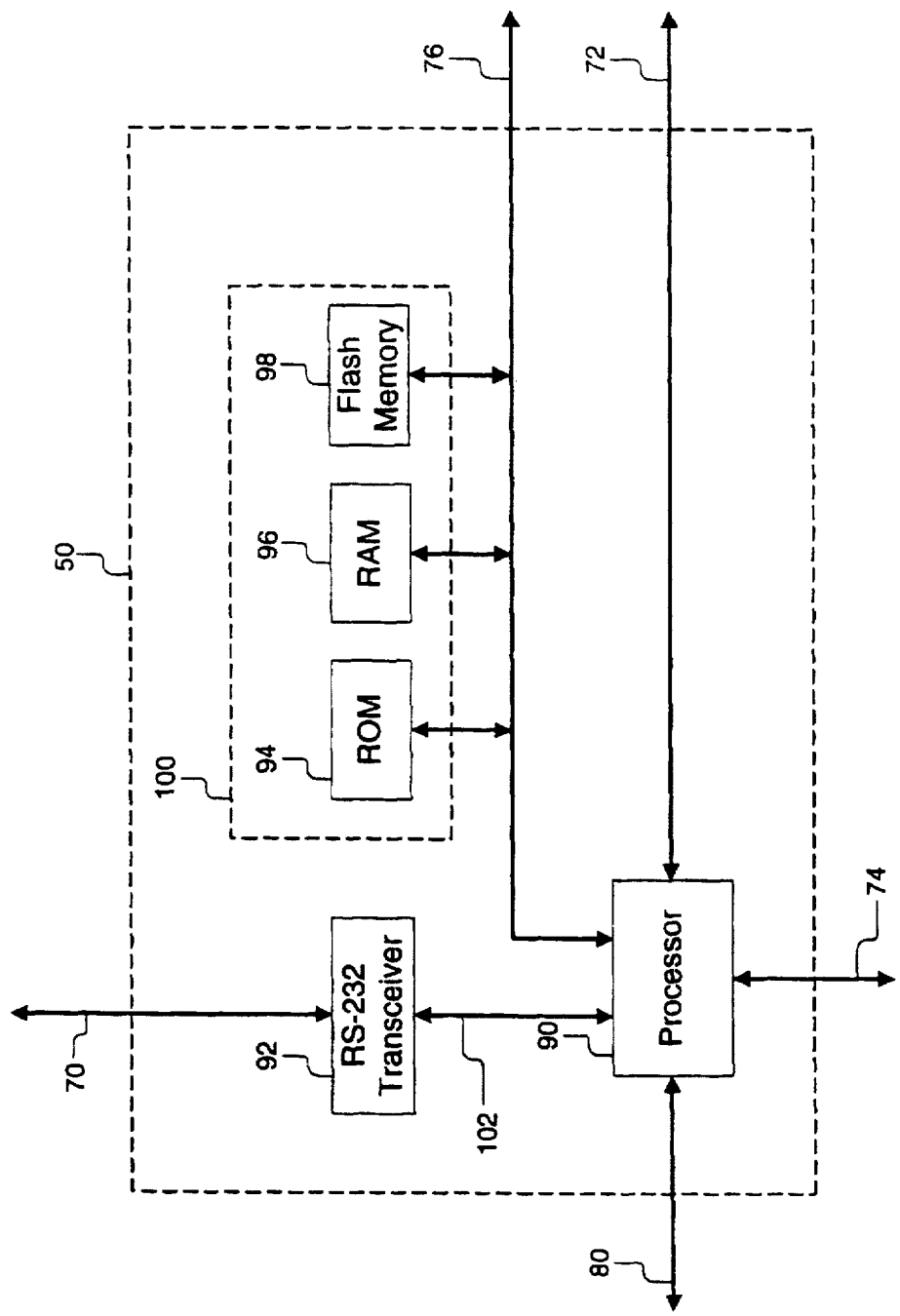
FIG. 3 is a block diagram of the processing and memory unit of the system of the present invention.

Referring now to FIG. 3, the processing and memory unit 50 is shown in more detail. The processing and memory unit 50 preferably comprises a processor 90, a transceiver 92 and a memory 100. The processor 90 has a plurality of inputs and outputs, and is coupled to lines 102, 80, 74, 72 and bus 76 as has been described above. The processor 90 is, for example, a 87C51 processor manufactured by Intel and operating at 20 MHz using an eight bit architecture and having an on chip universal asynchronous receiver transmitter (UART).

The processor 90 is coupled to the memory 100 by bus 76 to receive and store data as well as operational programs as will be described in more detail below with reference to FIG. 4. The memory 100 is preferably comprised of read-only memory (ROM) 94, random access memory (RAM) 96, and flash memory 98 each of which is coupled to bus 76. In an exemplary embodiment, the ROM 94 is 4 Kbytes in size, is on-chip on the processor 90 and stores boot and power up code; the RAM 96 is 8 Kbytes in size, is static random access memory and stores system variables and temporary data; and flash memory 98 is 512 Kbytes in size, stores the main code and provides a storage area for data. As has been noted above, the memory 100 may be expanded in size using the expansion memory 58 and the memory connector 62.

The processor 90 is also coupled by line 102 to the transceiver 92. The transceiver 92 is also coupled to line 70. In an exemplary embodiment, the transceiver 92 is a pair of RS-232 integrated circuit transceivers. Each of the RS-232integrated circuit transceivers preferably includes dual TTL-to-RS232 drivers and dual RS-232-to-TTL drivers. The transceiver 92 provides bidirectional communication with the computer 24 through the serial port and using the RS-232 standard. The transceiver 92 also includes RC filters to reduce EMI problems.

Figure 4:
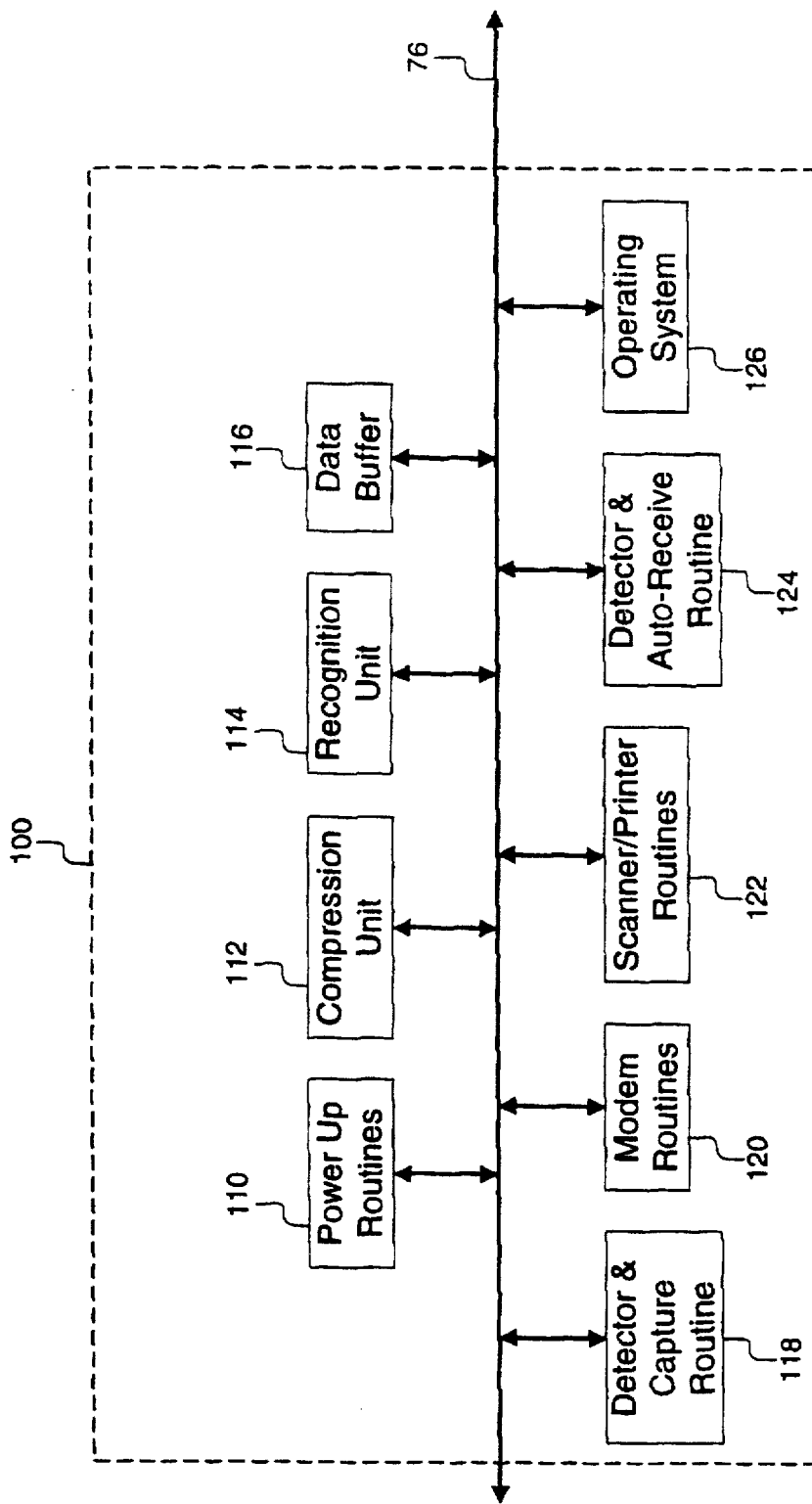
FIG. 4 is a block diagram of a preferred embodiment of the memory of the present invention.

Referring now to FIG. 4, a functional block diagram of the memory 100 of the present invention is shown. FIG. 4 illustrates the exemplary routines or programs stored by the memory 100 and executed by the processor 90 to perform the novel operations and functionality provided by the present invention. While the present invention is described as comprising different memories, units and routines coupled by bus 76 to the processor, those skilled in the art will realize that these memories, units, and routines may be programs controlling the processor 90 and stored in different portions of a contiguous memory. In the preferred embodiment, the memory 100 includes power up routines 110, a compression unit 112, a recognition unit 114, a data buffer 116, a detector and capture routine118, modem routines 120, scanner/printer routines 122 and detection and auto-receive routine 124 and an operating system 126.

The power up routines 110 are used to boot the processor 90 and perform a variety of tests to determine whether the system 20 and its components are operational. For example, the power up routines 110 preferably control the processor 90 and the facsimile-modem unit 52 to perform a variety of self tests, such as contents of each memory block, last mode of operation, integrity and functionality of various program codes, and functionality of lines and bus interfaces, prior to indicating on the status indicator 56 that they are operational.

The compression unit 112 stores compression routines and controls the processor 90 to compress incoming facsimile data before storage in the memory 100, specifically, the data buffer 116. The operation of the processor 90 under control of the compression unit 112 may be in accordance with use of any number of conventional compression algorithms applied to facsimile transmissions. For example, the compression unit 112 may include conventional compression routines such as the industry standards MH, MR, and MMR, and is performed only on incoming images that are found to have a special format, encoded FaxFile format, as is described below with reference to the recognition unit 114. Compression other than the industry standards MH, MR, and MMR, is not performed on ordinary faxes. The compression process is based on the fact that every pixel in any of the special FaxFile format is composed of more than one bit (normally, four). The present invention takes advantage of this fact by trimming each pixel to a level that would still keep it readable, to produce a file reduced a few fold without losing any data. This is done by utilizing a special error correction algorithm that identifies and verifies the boundaries of each individual pixel, after which operation it is reduced to one bit.

Figure 6:
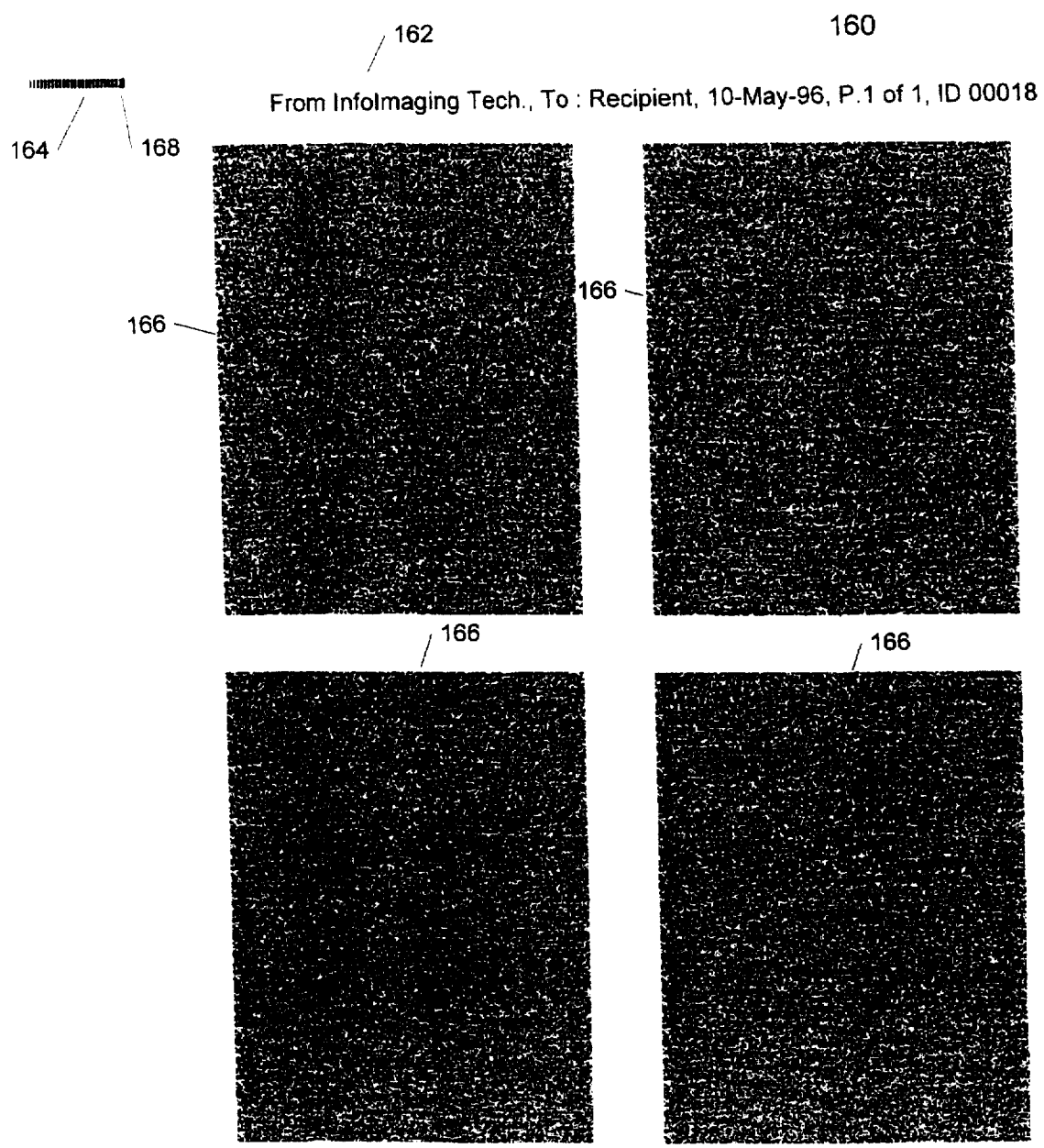
FIG. 6 is graphical representation of a page of facsimile data including an identifying section and encoded binary data according a preferred embodiment of a special format.

The recognition unit 114 is preferably routines for determining whether the facsimile data being received via the facsimile-modem unit 52 has a special format suitable for compression by elimination of particular portions of the facsimile. The operation of the recognition unit 114 is best understood with reference to FIG. 6. FIG. 6 shows an exemplary facsimile page 160 that has a special format according to the present invention that allows compression. In the preferred embodiment of the present invention, the special format includes a coded header 162, a bar code-like pattern 164 and a plurality of coded grids 166. The presence of such a bar code-like pattern 164 proximate the top of the facsimile page 160 signifies that the facsimile data is in a special format. It is composed of a number of Group 3 facsimile lines containing alternating two value pixels and a group of one value pixels forming a solid block, constructed in such a way to signify the special format even under harsh telephone line condition. The present invention reads the bar code 164 and header 162 during a listening stage of receiving a facsimile transmission. By reading the bar code 164 (vertical lines), the processor 90 effectively counts the number of lines of alternating pixels (n number of zeros and n number of ones) over the predetermined number of lines (preferably four to six lines) from the top of the facsimile page 160. At the end of the bar code 164 (vertical lines), a solid black rectangle 168 identifies the density mode of the transmitted special format as high, medium or low density. The solid black rectangle 168 is read by counting the number of consecutive bits (as opposed to alternating) that compose the rectangle. If neither the bar code 164 nor the solid black rectangle 168 are detected, the facsimile is treated as normal facsimile transmission and is not one with a special format suitable for compression.

The data buffer 116 is a portion of memory 100 used for storing data and for use as temporary storage by the processor 90. In the preferred embodiment, the data buffer 116 is used to store facsimile data until it can be sent to the computer 24, and also for storing data to be transmitted by the facsimile-modem unit 52 as a facsimile or digitally via the modem function. The data buffer 116 is preferably 512 K bytes so that the system 20 is capable of storing up to 18 pages of standard facsimile data (Based on standard ITU-T test chart #1 at standard resolution).

The detector and capture routine 118 includes routines for controlling the processor 90 such that it monitors the line interface unit 54 for incoming facsimile transmissions. In the capture mode, if such an incoming facsimile transmission is detected then the detector and capture routinely controls the line interface unit 54 to duplicate the transmission to the facsimile-modem unit 52. The facsimile-modem unit 52 receives the transmission. Once the transmission process is complete, the data comprising the facsimile transmission is transferred by the processor 90 to memory 100 for storage. The detector and capture routinely controls the operation of the processor 90 and maintains a virtual queue of the data buffer 116 in which facsimile transmissions can be stored. In the auto-receive mode, the detection and auto-receive routine 124 controls the line interface unit 54 to route the incoming transmission to the facsimile-modem unit 52 only. In the auto-receive mode, incoming facsimile transmissions are not received by the facsimile machine 26.

The modem routines 120 are routines that are executed by the processor 90 to enable the system 20 to function as an external modem to the computer 24. The modem routines 120 includes operating the processor 90 to provide a communication channel through the processor 90 to the facsimile-modem unit 52, and controlling the facsimile-modem unit 52 such that it functions as a modem and sends digital signals to the line interface unit 54 via line 68. The modem routines 120 via the processor 90 also configures the line interface 54 such that the facsimile-modem unit 52 output on line 68 is coupled to the telephone line via line 38.

The scanner/printer routines 122 also executed by the processor 90 to enable the system to operate a facsimile machine as a scanner or a printer. In a scanner mode, the processor 90 executes the scanner/printer routines 122 such that the line interface unit 54 couples the facsimile machine 26 (via line 36) to the facsimile-modem unit 52. The facsimile-modem unit 52 is also controlled by the processor 90 to operate in a mode of receiving facsimile transmissions. The processor 90 also transfers any incoming transmissions to the computer 24 in image form thereby effectively operating the system 20 and the facsimile machine 26 as a scanner for the computer 24. In a printer mode, the processor 90 executes the scanner/printer routines 122 such that the line interface unit 54 again couples the facsimile machine 26 (via line 36) to the facsimile-modem unit 52. Any information to be printed is converted to a facsimile format by the processor 90 and sent from the processor 90 to the facsimile-modem unit 52 and then to the facsimile machine 26 through the line interface. Thus, the facsimile machine 26 effectively operates as a printer for the computer 24.

The detection and auto-receive routine 124 is yet another portion of memory 100. The detection and auto-receive routine 124 will be described below in more detail with reference to FIG. 12. Basically, the detection and autoreceive routine 124 controls the processor 90 and monitors the computer 24 for its operational status. If the computer 24 is operational then incoming facsimile transmissions are sent directly to the computer 24. However, if the computer 24 is not operational, then the system 20 will store any incoming facsimile transmissions in memory 100 using the aforementioned compression unit 112, recognition unit 114 and the detection and capture routine118. When no facsimile machine is coupled with the system 20, the detection and auto-receive routine 124 controls the overall operation of the processor 90 and the execution of the other routines and units of memory 100.

The operating system 126 is a conventional operating system developed for the type of the preferable processor 90 used in this invention. Those skilled in the art will realize that a variety of other operating systems may be used, and it may vary depending on the processor used.

A specially developed PC software utility is installed in the computer 24 to allow it receive, store and view facsimile transmissions routed directly when it is operational, or download from the memory of system 20, when it becomes operational. A second software utility is installed in computer 20 to allow it to decode and view transmission of the special type described in FIG. 6.

Figure 5:
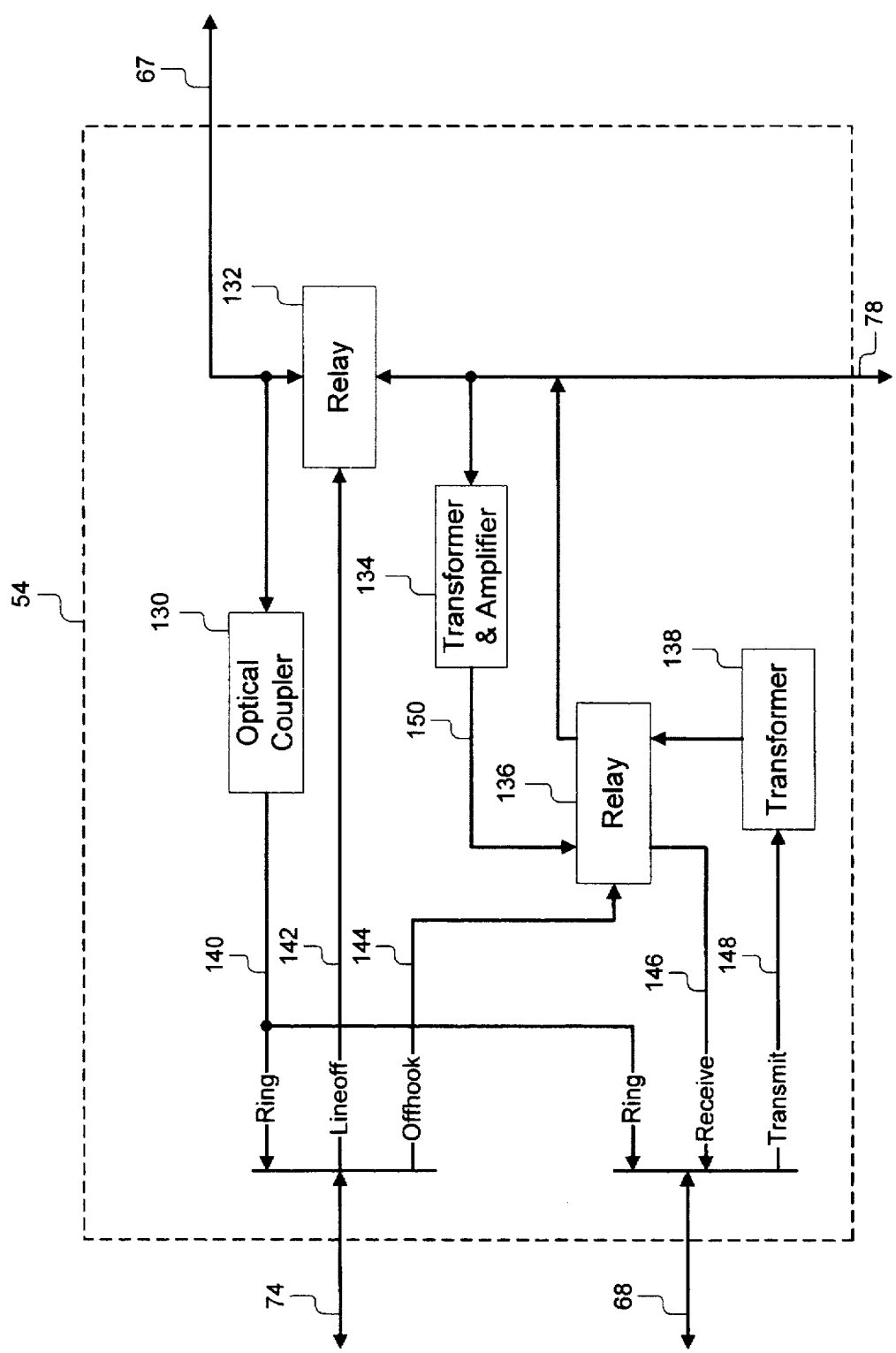
FIG. 5 is block diagram of a preferred embodiment of a line interface unit of the system constructed according to the present invention.

Referring now to FIG. 5, a block diagram of a preferred embodiment of the line interface unit 54 constructed according to the present invention is shown. The line interface unit 54 preferably comprises an optical coupler 130, a first relay 132, a transformer and amplifier 134, a second relay 136 and a transformer 138. The line interface unit 54 is coupled to the telephone line 28 via line 67/38, the facsimile machine via line 78/36, the facsimile-modem unit 52 via line 68 and the processor via line 74. The line interface unit 54 operates under the control of signals from the processor 90 and couples: 1) the telephone line 28 to the facsimile machine 26; 2) the telephone line 28 to the facsimile-modem unit 52; 3) the telephone line 28 to the computer 24.; 4) the facsimile machine 26 to the facsimile-modem unit 52; and 5) various combinations of these couplings.

The signal lines 74 and 68 are shown in more detail in FIG. 5 as each including three signal lines. Signal line 74 preferably includes a first signal line 140 for transmitting a ring detect signal, a second signal line 142 for sending a line-off control signal, and a third signal line 144 for sending an off-hook control signal. Signal line 68 preferably includes the first signal line 140 for transmitting a ring detect signal, a second signal line 146 for receiving data signals, and a third signal line 144 for receiving data signals. Signal lines 78 and 67 are a conventional tip and ring lines and are shown as a single line for ease of understanding.

As shown in FIG. 5, the optical coupler 130 and the first relay 132 are coupled to line 78 for connection to the telephone network (not shown). The optical coupler 130 is preferably a LED and photo diode pair. The optical coupler 130 provides electrical isolation between the system 20 and telephone line 28. The optical coupler 130 produces the ring signal on line 140 in response to assertion of such a signal on line 78. As shown in FIG. 5, line 140 forms a part of both signal line 74 and signal line 68. A line-off control signal is provided on line 142 and this control signal is sent from the processor 90 to the line interface unit 54, in particular, to a control input of first relay 132. The first relay 132 is coupled to both line 78 and line 67. The first relay 132 selectively couples and de-couples lines 78 and 67 in response to the line-off control signal received on line 142. The first relay 132 advantageously allows signals to be sent either from line 78 to line 67 and vice versa.

The transformer and amplifier 134 are coupled to line 67 to receive and amplify signals present on line 67. The output of the transformer and amplifier 134 is preferably coupled by line 150 to an input of the second relay 136. The second relay 136 has another input coupled to the output of transformer 138. Signals to be sent to either the telephone line 28 or the facsimile 26 are sent from the facsimile-modem unit 52 via line 148 to the transformer 138 and then to the second input of the second relay 136. The second relay 136 also provides a first output and a second output. The first output is coupled to line 78 and the second output is coupled by line 146 to provide the receive data signal. The second relay 136 also has a control input coupled by line 144 to receive the off-hook signal from the processor 90. The second relay 136 in response to the off-hook signal either couples the line 150 to line 146 so that a data signal can be received from line 67 or couples the output of transformer 138 to line 67 so that a data signal can be sent on line 67. Therefore, in response to control signals from the processor 90, the first and second relays 132, 136 can be operated the following exemplary configurations: 1) facsimile receive where the first relay 132 couples line 78 to 67 and the second relay 136 couples line 150 to 146; 2) facsimile send or modem send, where the first relay 132 couples line 78 to 67 and the second relay 136 couples the output of transformer 138 to line 67; or 3) scanner, where the first relay 132 de-couples line 78 from 67 and the second relay 136 couples line 150 to 146; 4) printer where the first relay 132 de-couples line 78 from 67 and the second relay 136 couples the output of transformer 138 to line 67.

Figure 7:
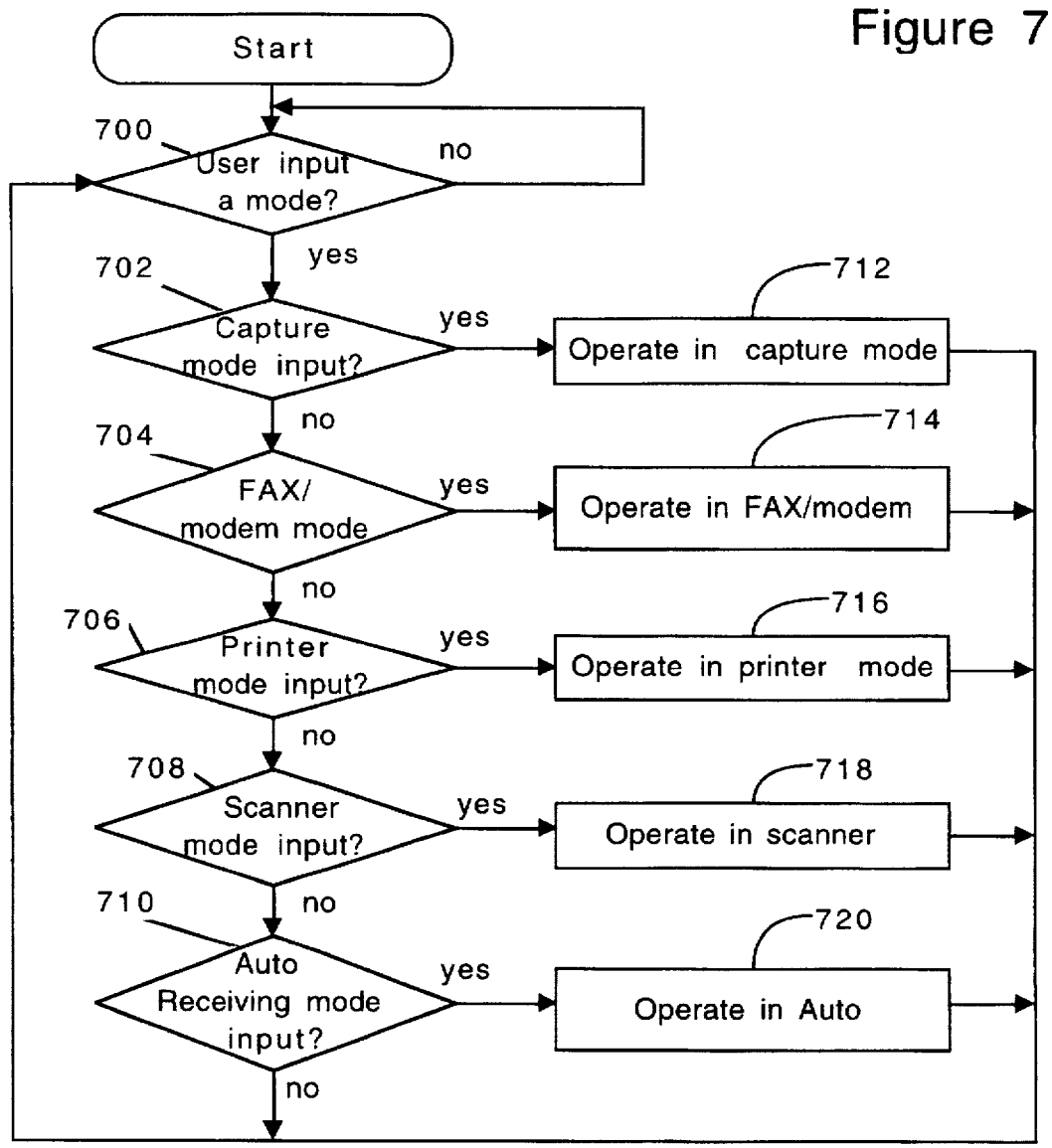
FIG. 7 is a flowchart of a preferred method for determining and establishing an operating mode for the system of the present invention.

Referring now to FIG. 7, a preferred method for determining and establishing an operating mode for the system 20 of the present invention is shown. The method begins in step 700 by testing whether the user has input a mode of operation for the system 20. This is typically done by inputting data and selections to the computer 24 which are transferred to the system 20 via line 34. If the user has not input a mode of operation, the method loops back to step 700 to periodically test whether a mode has been selected or the user wants to change the current mode of operation. If a mode of operation has been input, the method proceeds to step 702. In step 702, the method determines whether the capture mode was input. If the capture mode was input the process continues in step 712 by setting and initializing the system 20 for operation in the capture mode. After step 712, the method continues to operate in the set mode and then returns to step 700 to monitor for additional user input as to a change of mode. If in step 702, the method determines that the capture mode was not input, the method continues in step 704 by testing whether the fax/modem mode was input. If the fax/modem mode was input, the method continues to step 714 to set up the system 20 in the fax/modem mode, after which the method continues as has been described above. On the other hand, if the fax/modem mode was found not to be input in step 704, the method proceeds to step 706, where the method tests whether the printer mode was input. If so, the method sets the system 20 for operation in the printer mode in step 716, and then continues in step 700. The method similarly tests whether the mode selected was the scanner mode in step 708 or the auto-receiving mode in step 710, and then respectively performs step 718 or 720 to operate the system 20 the scanner mode or the auto-receiving mode. If the input mode is determined in step 710, not to be the auto-receiving mode, then the method does not change the operating mode of the system 20 and returns to step 700 to monitor for further operational mode changes from the user.

Figure 8:
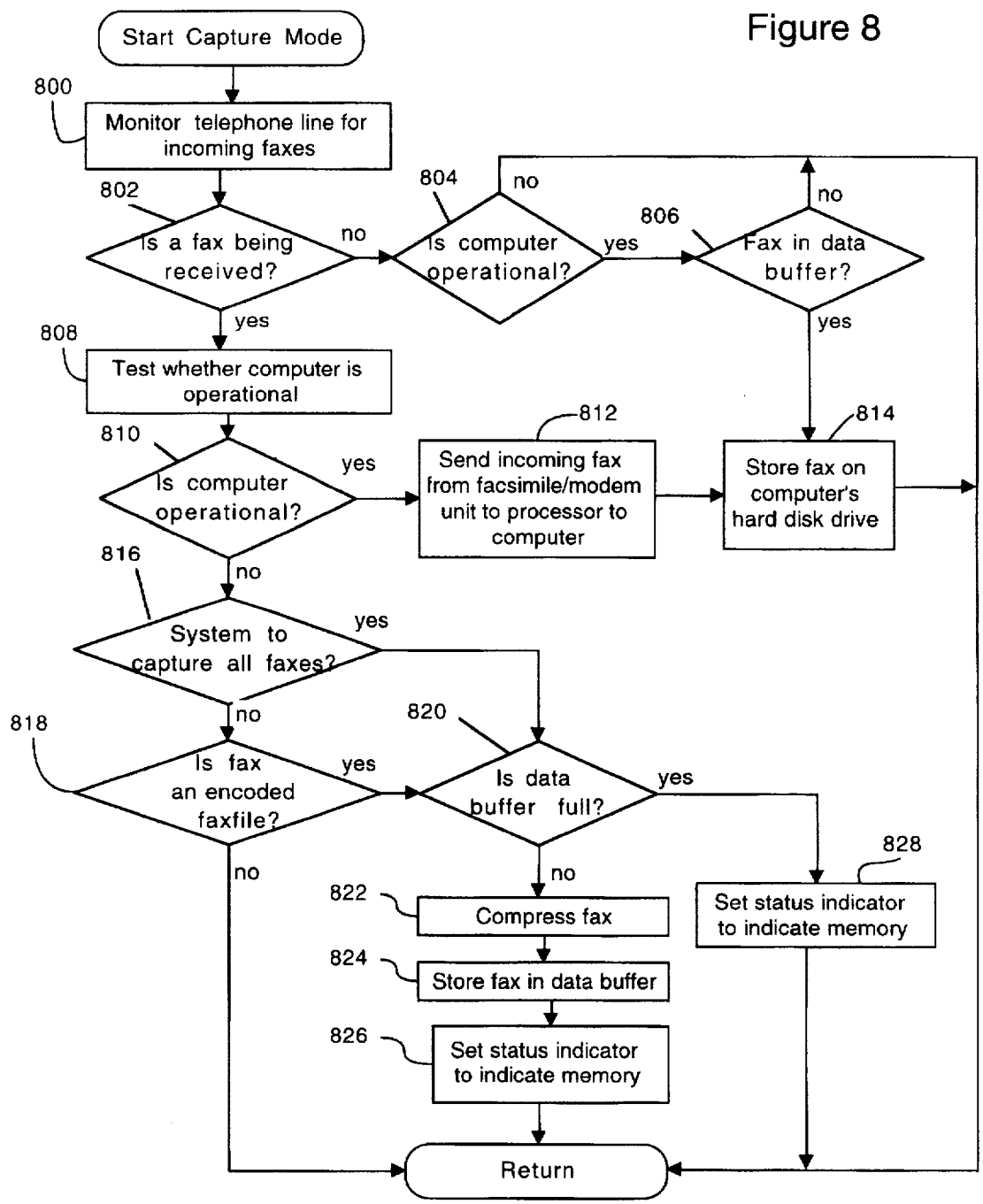
FIG. 8 is a flowchart of a preferred method for operating the system in a capture mode according to the present invention.

Referring now to FIG. 8, a flowchart of a preferred method for operating the system 20 in a capture mode according to the present invention is shown. The general operation and functions performed by the system 20 have been described above with reference to FIG. 4 and the detector and capture routine 118, but the system's operation in the capture mode will now be delineated with particularity. The method begins in step 800 by monitoring the telephone line 28 using the system 20 or processor 90. Next in step 802, the method determines whether a facsimile transmission is presently being received. If so, the method continues in step 808 to duplicate, process and store the incoming facsimile transmission. However, if a facsimile transmission is not being received, the system 20 is idle and uses the idle time to transfer any facsimile data that has been previously stored in memory 100 to the computer 24. The method transitions from step 802 to step 804 if a facsimile transmission is not being received, and in step 804, the method tests whether the computer 24 is operational. The processor 90 can determine whether the computer 24 is operational by sending signals on line 34 via the serial port 60. If the computer 24 is not operational, the method returns to step 700 (FIG. 7)__. However, if the computer 24 is operational, the method proceeds to step 806, where the processor 90 determines whether there are any facsimile transmissions stored in the data buffer 116 of the memory 100. If there are not any facsimile transmissions stored in the data buffer 116, there is nothing to transfer to the computer 24 and the method returns to step 700. If there are any facsimile transmissions stored in the data buffer 116, the method continues in step 814 by transferring the facsimile transmissions to the computer 24 and storing them on the computers hard disk drive (not shown). After step 814, the method returns to step 700.

If the system 20 determines a facsimile transmission is presently being received in step 802, the method continues in step 808. In step 808, the method determines whether the computer 24 is operational. If the computer 24 is operational, the system 20 does not store the incoming facsimile transmission at the system 20. Rather, in step 812, the method sends the incoming facsimile transmission from the line interface 54 to the facsimile-modem unit 52, and then from the facsimile-modem unit 52 through processor 90 to the computer 24. Then in step 814, the incoming facsimile transmission is stored on the hard disk drive or other non-volatile storage media of the computer 24. Again, after step 814, the method returns to step 700.

Figure 9:
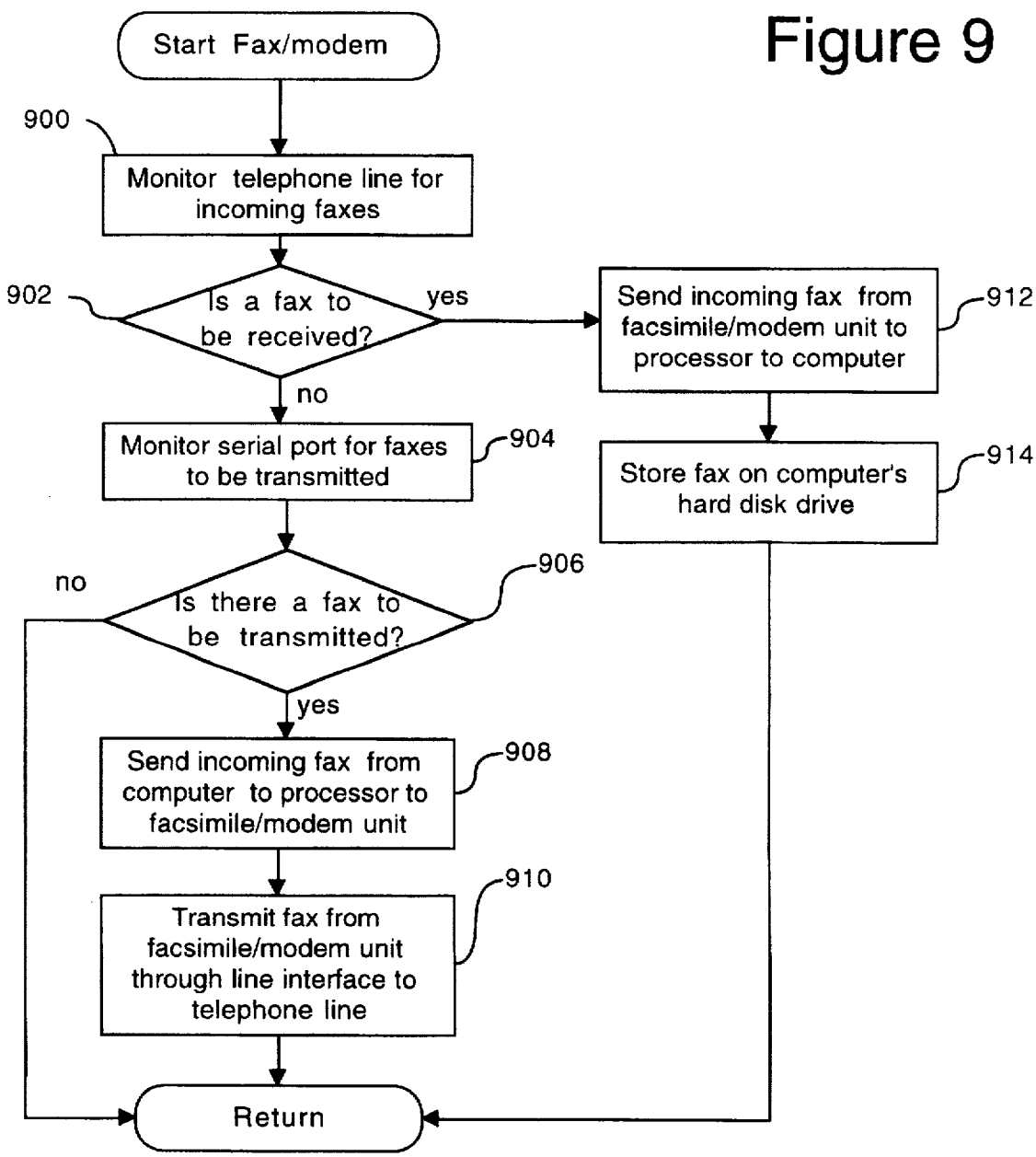
FIG. 9 is a flowchart of a preferred method for operating the system in a fax-modem mode according to the present invention.

If the computer 24 is determined not be operational in step 810, the method continues in step 816. In step 816, the method reads the settings for operation of the system 20 (such settings are set by default protocols in the power up routines 110), and determines whether all incoming facsimile transmissions regardless of type are to be stored by the system 20. The system 20 advantageously allows the user to customize operation of the system 20 such that: 1) all incoming facsimile transmissions are stored; or 2) only incoming facsimile transmissions having a special format, encoded FaxFile format, are stored. If the system 20 is to capture all incoming facsimile transmissions the method proceeds in step 820. If not, the method continues in step 818 to determine if the incoming facsimile transmission is in an encoded FaxFile format. The system 20 determines whether an incoming facsimile transmission is an encoded FaxFile using the recognition unit 114 as has been described above. If the incoming facsimile transmission is not in an encoded FaxFile format in step 818, the method returns to step 700. If the incoming facsimile transmission is found to be an encoded FaxFile, the system 20 moves to step 820 to start the storage process. In step 820, the method determines whether the data buffer 116 is full. If so, the method sets the status indicator 56 to indicate that the data buffer 116 or memory 100 is full, does not store the incoming facsimile transmission, and returns to step 700. However, if the data buffer 116 is not full, the method continues in step 822, where the incoming facsimile transmission is compressed using the methods described above. Next, in step 824, the compressed version of the facsimile transmission is stored in the data buffer 116, and then in step 826 the status indicator 56 is set to indicate that the data buffer 116 holds at least one facsimile transmission. Finally, after step 826, the method returns to step 700. The description of the capture mode has focused primarily on the operations performed by the system 20 in storing or capturing the facsimile transmissions. However, it should be understood that during operation in the capture mode, the processor 90 asserts the control signals, line-off and off-hook to the line interface 54 such that any facsimile transmission on line 38/67 are passed through relay 132 to line 78 and onto the facsimile machine 26 via line 36. Referring now to FIG. 9, a flowchart of a preferred method for operating the system 20 in a fax-modem mode is shown. The preferred method begins in step 900 by monitoring the telephone line 28 using the system 20 or processor 90 for incoming facsimile transmissions. Next in step 902, the system 20 determines whether a facsimile transmission is being received. Basically, the system 20 provides a priority for incoming facsimile transmissions over outbound facsimile transmissions or modem communications. If a facsimile transmission is being received, the method moves to step 912 and sends the incoming facsimile transmission from the line interface 54 to the facsimile-modem unit 52, and then from the facsimile-modem unit 52 through processor 90 to the computer 24. Next in step 912, the incoming facsimile transmission is stored on the hard disk drive of the computer 24, and after step 914, the method returns to step 700.

If a facsimile transmission is not being received, the method moves to step 904 and monitors the serial port 60 for facsimile data to be transmitted. Then in step 906, the processor 90 determines whether there are any facsimile data from the computer 24 to be transmitted over the telephone line 28. If there is not the method returns to step 700. If there are facsimile data to be transmitted over the telephone line 28, the method sends the facsimile data from the computer 24 to processor 90, and then from the processor 90 to the facsimile-modem unit 52 in step 908. Then in step 910, the method sends the facsimile data by transmitting it from the facsimile-modem unit 52 through the line interface unit 54 over the telephone line 28 via the connector jack 66. Finally, after step 910, the method returns to step 700.

Figure 10:
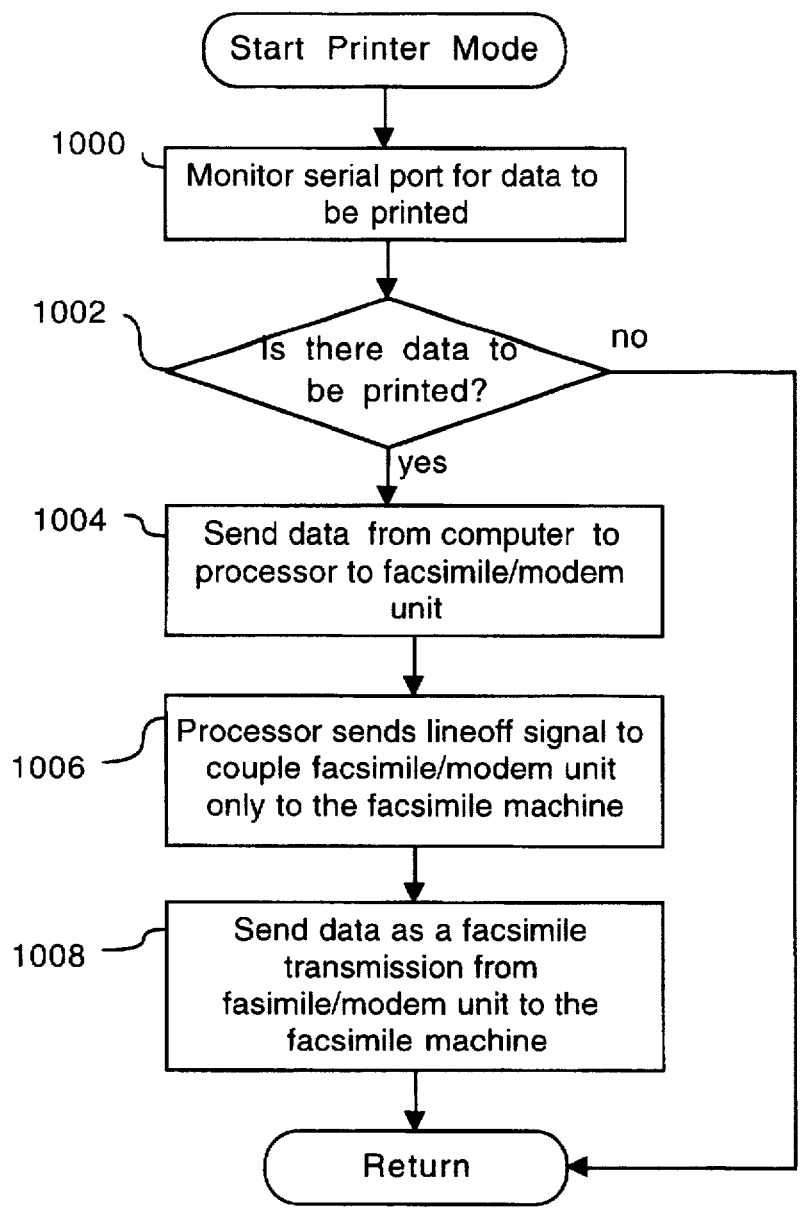
FIG. 10 is a flowchart of a preferred method for operating the system in a printer mode according to the present invention.

FIG. 10 shows a flowchart of a preferred method for operating the system 20 in the printer mode of the present invention. In the printer mode, the computer 24 is able to use the facsimile machine 26 as a printer because the system 20 of the present invention essentially reformats the data to be printed as a facsimile transmission and then sends it to the facsimile machine 26. This method for operation of the system 20 begins in step 1000 with the system 20, in particular, the processor 90 monitoring the serial port 60 for data to be printed. The data to be printed is preferably provided in the format of facsimile data for transmission, just as would be provided if the data were to be sent over the telephone line 28. Then in step 1002, the method tests if there is a data to be printed provided at the serial port 60. If there is not data to be printed provided at the serial port 60, the method returns to step 700. If there is data to be printed present at the serial port 60, the method continues in step 1004. In step 1004, the method sends the data to be printed from the computer 24 to the processor 90 and then to the facsimile-modem unit 52. Next in step 1006, the processor 90 sends the line-off signal and the off-hook signal to the line interface unit 54 such that the transmit line 148 will only be coupled to the facsimile machine 26 via line 36/78 and the facsimile-modem unit 52 will not be coupled to the telephone line 28. Then in step 1008, the facsimile-modem unit 52 sends the data to be printed as a facsimile transmission to facsimile machine 26 on the path configured in step 1006. Finally, after step 1008, the method returns to step 700.

Figure 11:
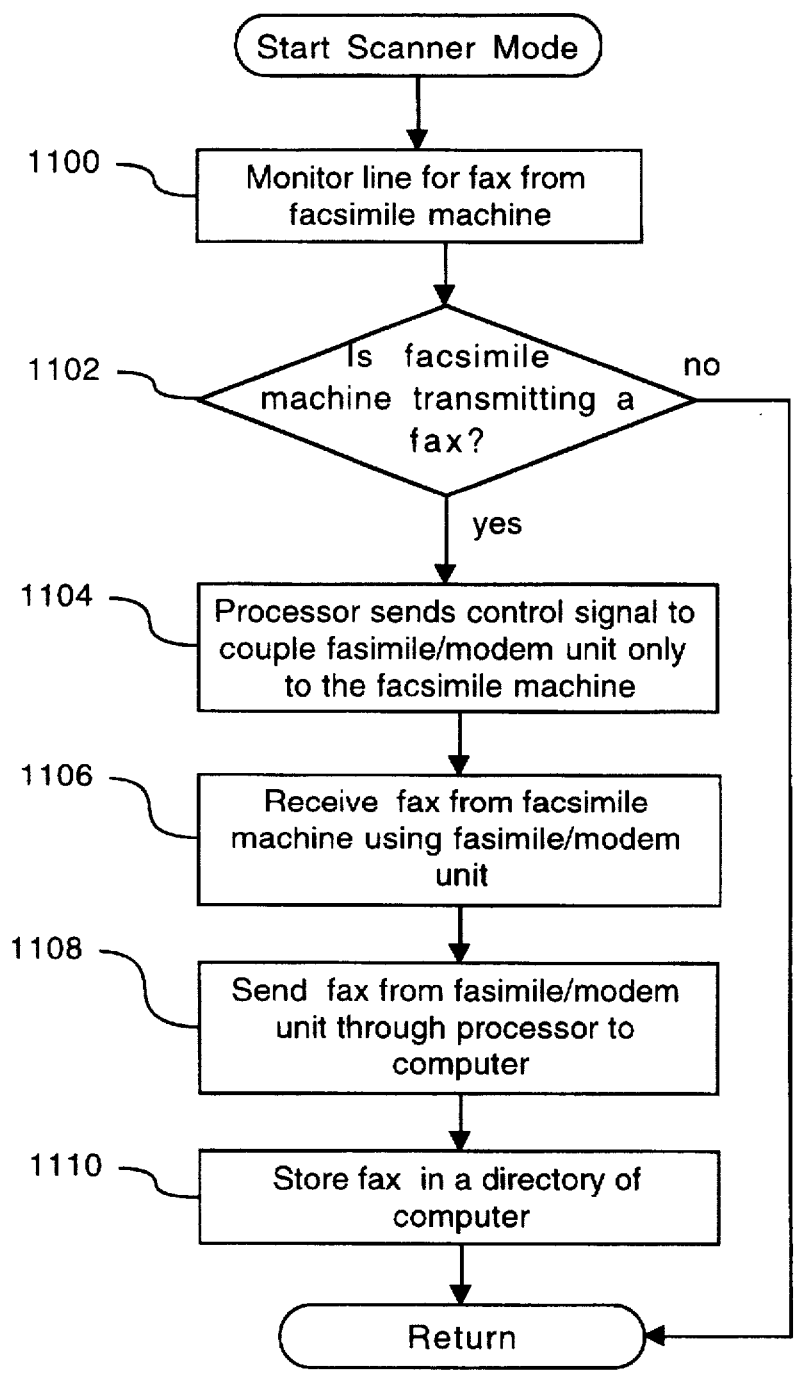
FIG. 11 is a flowchart of a preferred method for operating the system in a scanner mode according to the present invention.

FIG. 11 shows a flowchart of a preferred method for operating the system 20 in the scanner mode of the present invention. The scanner mode is similar to the printer mode in that the line interface unit 54 is similarly coupled, the difference being that the data is transmitted from the facsimile machine 26 to the computer 24 as opposed to from the computer 24 to the facsimile machine 26. The computer 24 is able to use the facsimile machine 26 as a scanner because the system 20 of the present invention provides a dedicated data transfer path between the facsimile machine 26 and the computer 24. The method for operation of the system 20 as a scanner begins in step 1100 with the system 20, monitoring line 36 via the line interface unit 54 for an image transmission from the facsimile machine 26. Next in step 1102, the method determines whether the facsimile machine 26 is transmitting an image transmission. If not, the method returns to step 700. However, if the facsimile machine 26 is transmitting an image transmission, the method proceeds to step 1104. In step 1104, the processor 90 sends the line-off and off-hook control signals to couple the receive line 146 to the line 36/78, and disconnect the facsimile machine 26 from line 67 using relay 132. Then in step 1106, the scanned data, now in the form of an image transmission, is received by the facsimile-modem unit 52 from the facsimile machine 26 via the line interface unit 54. Next in step 1108, the received facsimile transmission is sent from the facsimile-modem unit 52 through the processor 90 to the computer 24. Finally, in step 1110, the received facsimile transmission is stored in a directory of the computer's hard disk drive, and the scanning is complete. After step 1110, the method returns to step 700.

Figure 12:
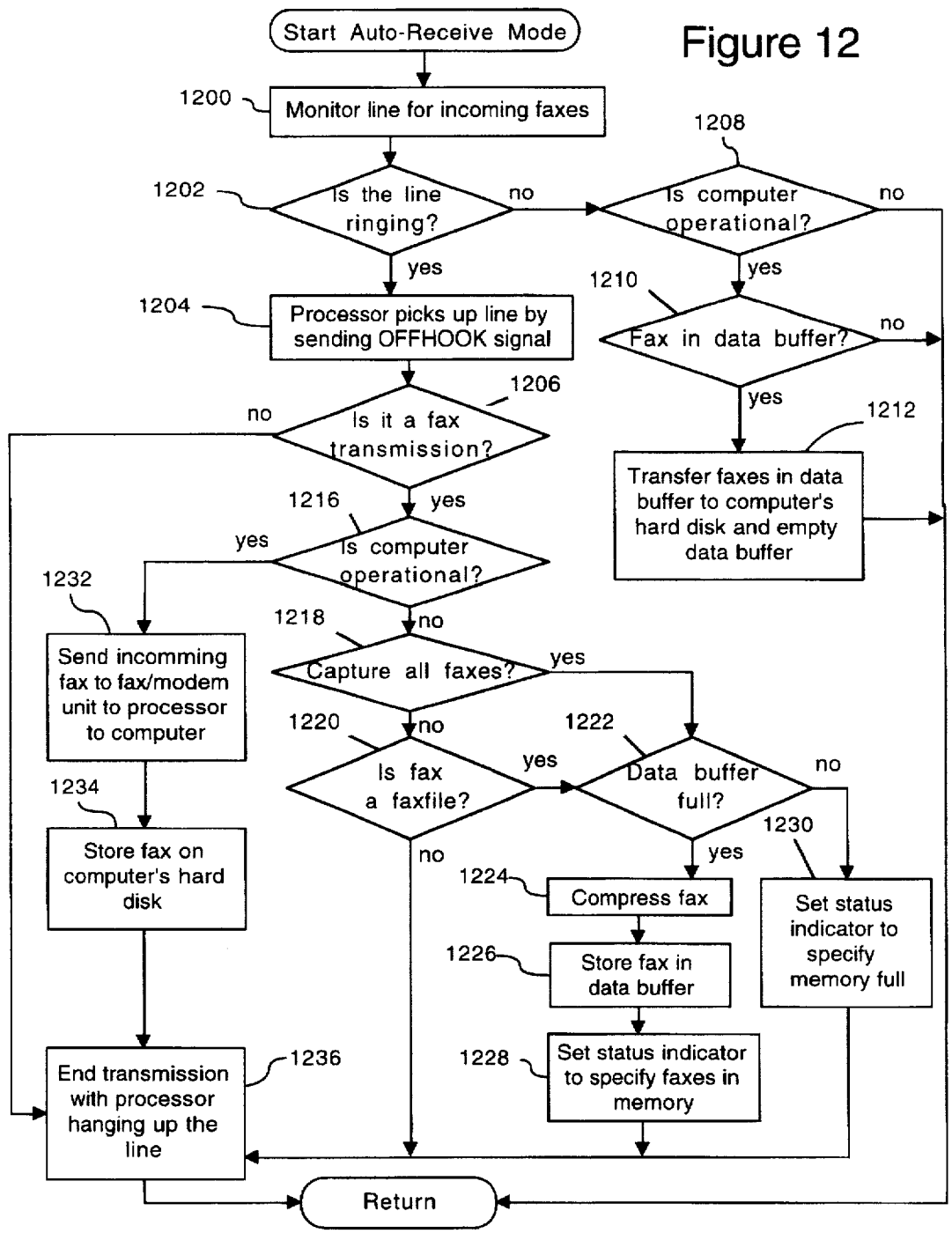
FIG. 12 is a flowchart of a preferred method for operating the system in an auto-receiving mode according to the present invention.

Referring now to FIG. 12, a preferred method for operating in the auto-receive mode is shown. It should be understood that the incoming facsimile transmissions received on the telephone line 28 are not routed to the facsimile machine 26 in the auto-receive mode, in stark contrast to the operation of the system 20 in capture mode. Preferably, the auto-receive mode is used when the facsimile machine is not operational or not even connected to the system 20. Throughout operation of the system 20 in the auto-receive mode, the processor 90 asserts the control signals, off-hook and line-off, such that incoming signals are not provided on line 78 to the facsimile machine 26. The method for auto-receive mode begins in step 1200 by monitoring the telephone line 28 for incoming facsimile transmissions using the system 20 or processor 90. Next in step 1202, the method determines whether the telephone line 28 is ringing, the ring portion of line being asserted, signaling the beginning of transmission of a facsimile. If the telephone line 28 is not ringing, the system 20 is idle and uses the idle time to download any facsimile data that has been previously stored in memory 100 to the computer 24. If the telephone line 28 is not ringing the method transitions from step 1202 to step 1208, and the method tests whether the computer 24 is operational. If the computer 24 is not operational, the method returns to step 700. However, if the computer 24 is operational, the method proceeds from step 1208 to step 1210, where the processor 90 determines whether there are any facsimile transmissions stored in the data buffer 116 of the memory 100. If there are not any facsimile transmissions stored in the data buffer 116, there is nothing to transfer to the computer 24 and the method returns to step 700. If there are any facsimile transmissions stored in the data buffer 116, the method proceeds from step 1210 to step 1212 and transfers the facsimile transmissions in the data buffer 116 to the computer's hard disk drive (not shown) to empty the data buffer 116. After step 1212, the method returns to step 700.

If the system 20 determines the telephone line 28 is ringing in step 1202, the method continues in step 1204. In step 1204, the processor 90 picks up the telephone line 28 by sending the off-hook signal. Next in step 1206, the method determines whether the incoming signal being sent is a facsimile transmission. The system 20 uses the facsimile-modem unit 52 to monitor the line 28 via the interface unit 54 and determine whether the incoming signal being sent meets a protocol to identify it as a facsimile transmission. If the incoming signal is not a facsimile transmission, the method proceeds to step 1236 where the transmission is ended with processor 90 hanging up the telephone line 28 by de-asserting the off-hook signal. On the other hand, if the incoming signal is recognized as a facsimile transmission, the method continues in step 1216 by testing whether the computer 24 is operational. If the computer 24 is operational, the system 20 does not store the incoming facsimile transmission at the system 20, but instead in step 1232, the method sends the incoming facsimile transmission from the line interface 54 to the facsimile-modem unit 52, and then from the facsimile-modem unit 52 through processor 90 to the computer 24. Then in step 1234, the incoming facsimile transmission is stored on the hard disk drive of the computer 24. After step 1234, the method continues in step 1236 to end the transmission.

If the computer 24 is determined not be operational in step 1216, the method continues in step 1218. In step 1218, the method reads the settings for operation of the system 20, and determines whether all incoming facsimile transmissions regardless of type are to be stored by the system 20. The system 20 can either 1) store all incoming facsimile transmissions; or 2) store only incoming facsimile transmissions having a special format, encoded FaxFile format. If the system 20 is to receive all incoming facsimile transmissions the method proceeds to step 1222. If not, then the method continues in step 1220 to determine if the incoming facsimile transmission is in the encoded FaxFile format. If the incoming facsimile transmission is determined not to be in an encoded FaxFile format in step 1220, the method moves to step 1236 where the transmission is ended. If the incoming facsimile transmission is found to be an encoded FaxFile, the system 20 moves to step 1222 to start the storage process. In step 1222, the method first determines whether the data buffer 116 is full. If so, the method sets the status indicator 56 to indicate that the data buffer 116 or memory 100 is full in step 1230, does not store the incoming facsimile transmission, and proceeds to step 1236 to end the transmission. However, if the data buffer 116 is not full, the method continues in step 1224, where the incoming facsimile transmission is compressed using the compression method described elsewhere above. Next, in step 1226, the compressed version of the facsimile transmission is stored in the data buffer 116, and then in step 1228 the status indicator 56 is set to indicate that the data buffer 116 holds at least one facsimile transmission. Finally, after step 1236, the method ends the transmission before returning to step 700.

While the present invention has been described with reference to certain preferred embodiments, those skilled in the art will recognize that various modifications may be provided. These and other variations upon, and modifications to the preferred embodiments are provided for by the present invention, which is limited only by the following claims.

What is claimed is:

1. A data transfer system for transferring data between a facsimile machine, a telephone network and a computer, the data transfer system comprising:

a processing unit coupled to the computer;

a memory coupled to the processing unit providing a buffer for storing data;

a facsimile-modem unit for converting data to and from facsimile and modem protocols, the facsimile-modem unit coupled to the processing unit; and a line interface unit for selectively coupling the computer, the telephone network, the facsimile machine and the facsimile-modem unit, the line interface unit coupled to the telephone network, the facsimile machine, the facsimile-modem unit, and the processing unit, wherein the line interface unit comprises:

a first coupling means having a first terminal, a second terminal and a control terminal for selectively coupling the first terminal to the second terminal in response to a signal applied to the control terminal, the first terminal coupled to the telephone network, the second terminal coupled to the facsimile machine and control terminal coupled to the processing unit;

a second coupling means having a first terminal, a second terminal and a control terminal for selectively coupling the first terminal of the second coupling means to the second terminal of the second coupling means, the first terminal of the second coupling means coupled to the facsimile-modem unit, the second terminal of the second coupling means coupled to the facsimile machine and control terminal of the second coupling means coupled to the processing unit, a transformer and amplifier for converting a signal, the transformer and amplifier coupled between the facsimile machine and the second terminal of the second coupling means;

a transmitting transformer for converting signals, the transmitting transformer coupled between the line interface unit and the first terminal of the second coupling means; and an isolation coupler having a first terminal and a second terminal, the first terminal of the isolation coupler connected to the telephone network and the second terminal of the isolation coupler connected to the processing unit.

2. The system of claim 1, further comprising an input/output port and an RS-232 transceiver for coupling the processing unit to the computer.

3. The system of claim 1, further comprising a status indicator for providing visual output as whether the data buffer is full and whether the data buffer stores a facsimile, the status indicator coupled to the processing unit.

4. The system of claim 1, further comprising:

an extension memory for increasing the size of the data buffer, and a memory connector for coupling the extension memory to the processing unit and memory.

5. The system of claim 1, further comprising:

a power supply for providing power to the processing unit, the memory, the facsimile-modem unit, and the line interface unit; and wherein the system is operational independent of operation of the computer and the facsimile machine.

6. The system of claim 1, wherein the memory further comprises a recognition unit for determining whether facsimile data being received via the facsimile-modem unit has a special format suitable for compression, the recognition unit coupled to control the processing unit.

7. The system of claim 1, wherein the memory further comprises a detection and auto-receive unit for controlling the operation of the processing unit to detect the presence of and store incoming facsimile transmissions received via the line interface unit, the detection and auto-receive unit coupled to the processing unit.

8. The system of claim 1, wherein the memory further comprises a detection and capture unit for controlling the operation of the processing unit to detect the presence of and store incoming facsimile transmissions received via the line interface unit and for controlling the line interface unit to provide the incoming facsimile transmissions to the facsimile machine, the detection and capture unit coupled to the processing unit.

9. The system of claim 1, wherein the first and second coupling means are relays.

10. A method of receiving and storing facsimile transmissions in a data transfer system coupled to a computer and a telephone line, the method comprising the steps of:

monitoring the telephone line for a facsimile transmission;

receiving a facsimile transmission;

determining whether the computer is operational;

transferring the facsimile transmission from the data transfer system to the computer if the computer is operational; and storing the facsimile transmission in a memory of the data transfer system if the computer is operational wherein the step of storing the facsimile transmission comprises the steps of:

determining whether the memory has space in which to store the facsimile transmission;

storing the facsimile transmission in a memory of the data transfer system if the memory has space;

determining whether the facsimile transmission has an encoded format; and the storing step is performed only if the facsimile transmission has the encoded format.

11. The method of claim 10, further comprising the steps of:

determining whether a facsimile transmission is being received;

determining whether the computer is operational;

determining whether any stored transmissions exist in the memory of the data transfer system; and;

transferring the stored transmissions from the data transfer system to the computer if the computer is operational if any stored transmissions exist.

12. The method of claim 10, wherein step of transferring the facsimile transmission comprises the steps of:

sending the facsimile transmission from a facsimile-modem unit to a processing unit of the data transfer system;

sending the facsimile transmission from the processor to the computer; and storing the facsimile transmission on a storage media of the computer.

13. The method of claim 10, wherein the step of storing the facsimile transmission further comprises the steps of:

compressing the facsimile transmission; and setting a status indicator specifying that the memory holds at least one facsimile transmission.

14. The method of claim 10 further comprising the step of transmitting the facsimile transmission to the facsimile machine.

15. A data transfer system for transferring data between a facsimile machine, a telephone network and a computer, the data transfer system comprising:

a processing unit coupled to the computer;

a memory coupled to the processing unit providing a buffer for storing data, wherein the memory comprises a recognition unit for determining whether facsimile data being received via the facsimile-modem unit has a special format suitable for compression, the recognition unit coupled to control the processing unit;

a facsimile-modem unit for converting data to and from facsimile and modem protocols, the facsimile-modem unit coupled to the processing unit; and a line interface unit for selectively coupling the computer, the telephone network, the facsimile machine and the facsimile-modem unit, the line interface unit coupled to the telephone network, the facsimile machine, the facsimile-modem unit, and the processing unit.

16. The system of claim 15, wherein the memory further comprises a detection and auto-receive unit for controlling the operation of the processing unit to detect the presence of and store incoming facsimile transmissions received via the line interface unit, the detection and auto-receive unit coupled to the processing unit.

17. The system of claim 15, wherein the memory further comprises a detection and capture unit for controlling the operation of the processing unit to detect the presence of and store incoming facsimile transmissions received via the line interface unit and for controlling the line interface unit to provide the incoming facsimile transmissions to the facsimile machine, the detection and capture unit coupled to the processing unit.

* * * * *